T. E. MURRAY.
METAL VEHICLE WHEEL.
APPLICATION FILED FEB. 18, 1916.

1,192,548.

Patented July 25, 1916.

Inventor
Thomas E. Murray
By his
Attorney

UNITED STATES PATENT OFFICE.

THOMAS E. MURRAY, OF NEW YORK, N. Y.

METAL VEHICLE-WHEEL.

1,192,548.  Specification of Letters Patent.  Patented July 25, 1916.

Application filed February 16, 1916. Serial No. 79,049.

*To all whom it may concern:*

Be it known that I, THOMAS E. MURRAY, a citizen of the United States, residing at New York, in the county of New York and State of New York, have invented a certain new and useful Improvement in Metal Vehicle-Wheels, of which the following is a specification.

The invention relates to metal vehicle wheels, and consists in the construction of the tubular spokes and the means of locking the same together and to a hub, as more particularly hereinafter set forth.

Figure 1:
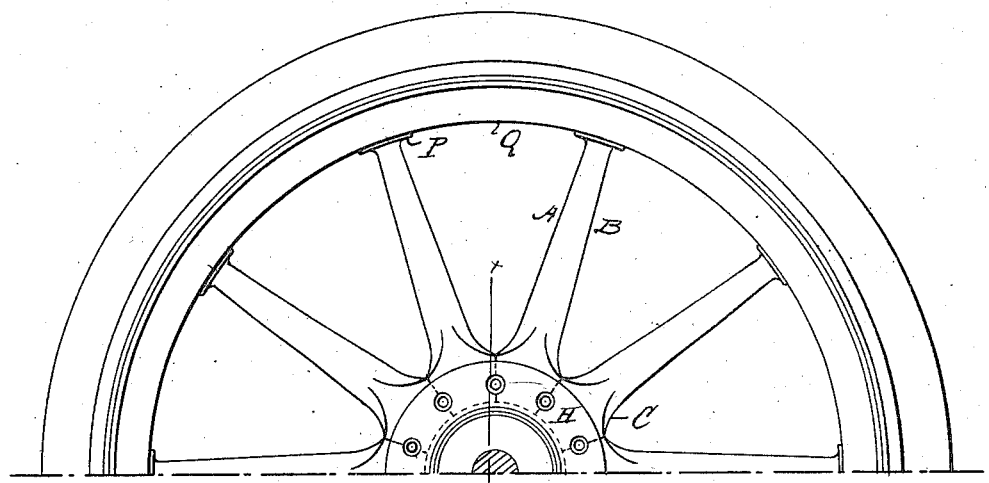
Figure 2:
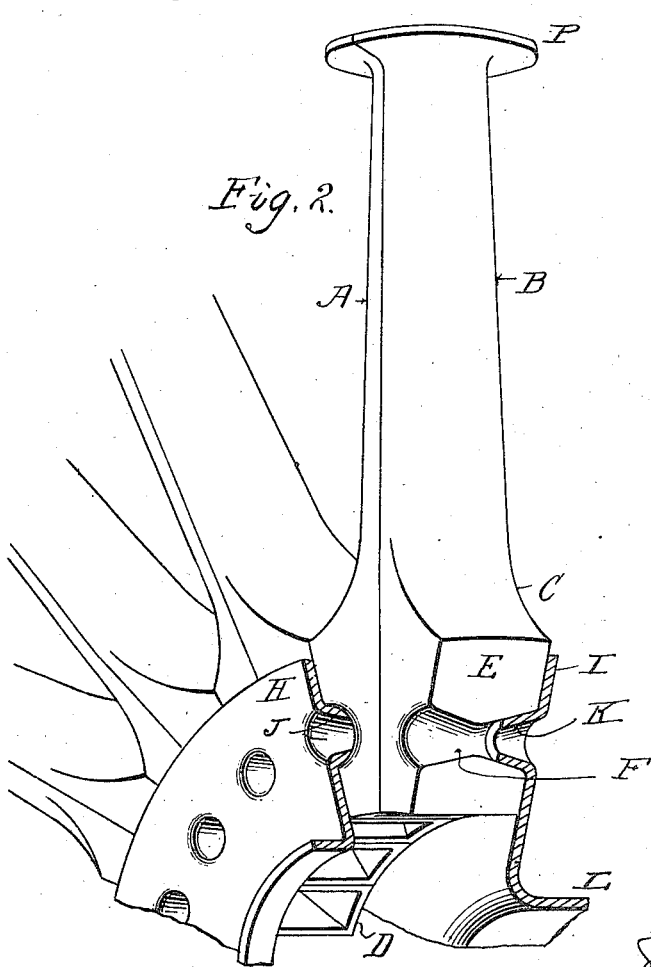
Figure 3:
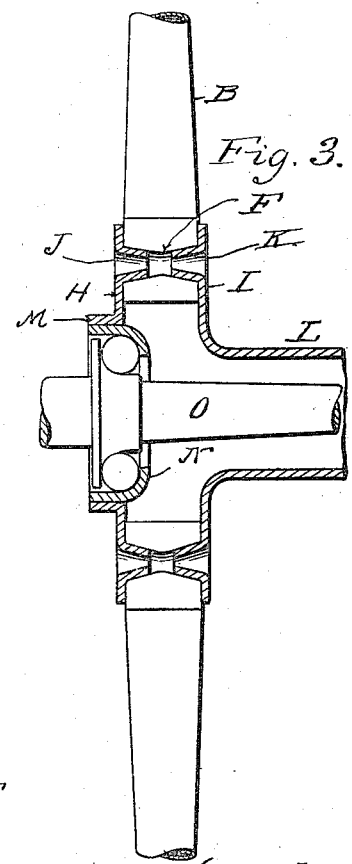

In the accompanying drawings—Figure 1 is an elevation of one-half of my wheel. Fig. 2 is a perspective view of one spoke and portions of two spokes adjacent thereto, showing the rings H, I in section. Fig. 3 is a diametral section of my wheel on the line $x, x$ of Fig. 1.

Similar letters of reference indicate like parts.

Each tubular spoke is made of sheet metal in two half sections A, B, which register at their edges and are united by welding. Each spoke is enlarged at its inner end portion, as shown at C, so as to take the shape of an inverted wedge-frustum, the extremity D being an arc. The sides E are in planes radial to the central axis of the wheel, so that when the several spokes are placed with said sides in contact, said frusto-wedge shaped portions form a nave.

In each side E is a transverse recess F, preferably formed by striking up the metal. When the recesses F of two adjacent spokes come together, a tube of the metal of the spoke is formed tapering inwardly, and then outwardly, and extending from face to face of said nave.

On the opposite faces of the enlarged portions C are metal rings H, I, having openings which register with but are smaller in diameter than the outer ends of the openings formed by recesses F. By any suitable tool inserted in the openings in rings H, I, I force the metal around said openings into the openings formed by recesses F, thus producing inwardly tapered tubular projections J, K, which fit closely in said last-named openings and lock the spokes together. The ring I may be the fixed flange of a hub L, and the ring H may be a flange on a collar M, secured on the casing N of a ball-bearing runway supported in turn on the axle O. Said nave is centrally supported by the projections J, K, as shown in Figs. 2 and 3, and also, if desired, by welding the rings H, I to the faces of said nave. On the other end of each spoke may be an integral flange P, which may be welded to the inner periphery of the rim Q.

Instead of driving the tubular projections on the rings into the recesses after said rings are in place, I may first form said projections on said rings and then introduce them into said openings.

I claim:

1. A metal vehicle wheel, comprising a plurality of hollow spokes having frusto-wedge-shaped enlargements at their inner ends, the inclined sides of said enlargements being placed in juxtaposition to form a nave, and the inclined sides of each spoke having a struck up recess tapering inwardly from opposite faces of said spoke and registering with similar recesses in the inclined sides of the adjacent spokes to form tubes extending through said nave, and tapered pins received in opposite ends of said tubes and locking said spokes together.

2. A metal vehicle wheel, comprising a plurality of hollow spokes having frusto-wedge-shaped enlargements at their inner ends, the inclined sides of said enlargements being placed in juxtaposition to form a nave, and the inclined sides of each spoke having a struck up recess tapering inwardly from opposite faces of said spoke and registering with similar recesses in the inclined sides of the adjacent spokes to form tubes extending through said nave, rings in contact with the opposite faces of said nave, and tapered projections on said rings received in opposite ends of said tubes and locking said spokes together.

3. A metal vehicle wheel, comprising a plurality of spokes having frusto-wedge-shaped enlargements at their inner ends, the inclined sides of said enlargements being placed in juxtaposition to form a nave, and the inclined sides of each spoke having a recess tapering inwardly from opposite faces of said spoke and registering with similar recesses in the inclined sides of the adjacent spokes to form openings through said spokes, rings in contact with the opposite faces of said nave, and struck up tubular projections on said rings received in opposite ends of said openings and locking said spokes together.

4. A metal vehicle wheel, comprising a plurality of spokes having frusto-wedge-shaped enlargements at their inner ends, the inclined sides of said enlargements being placed in juxtaposition to form a nave, and the inclined sides of each spoke having a recess tapering inwardly from opposite faces of said spoke and registering with similar recesses in the inclined sides of the adjacent spokes to form openings through said spokes, a hub, ring flanges on said hub in contact with opposite faces of said nave, and projections on said flanges received in said openings and locking said spokes together and to said hub.

5. A metal vehicle wheel, comprising a plurality of spokes having frusto-wedge shaped enlargements at their inner ends, the inclined sides of said enlargements being placed in juxtaposition to form a nave, and the inclined sides of each spoke having a recess tapering inwardly from opposite faces of said spoke and registering with similar recesses in the inclined sides of the adjacent spokes to form openings through said spokes, a hub, ring flanges on said hub in contact with opposite faces of said nave, and projections on said flanges received in said openings and locking said spokes together and to said hub and centrally supporting said nave.

6. A metal vehicle wheel, comprising a plurality of spokes having frusto-wedge shaped enlargements at their inner ends, the inclined sides of said enlargements being placed in juxtaposition to form a nave, and the inclined sides of each spoke having a recess tapering inwardly from opposite faces of said spoke and registering with similar recesses in the inclined sides of the adjacent spokes to form openings through said spokes, a hub, and ring flanges on said hub welded to opposite faces of said nave and centrally supporting said nave.

In testimony whereof I have affixed my signature in presence of two witnesses.

THOMAS E. MURRAY.

Witnesses:
GERTRUDE T. PORTER,
MAY T. McGARRY.